United States Patent [19]

Ohlinger et al.

[11] Patent Number: 4,808,900
[45] Date of Patent: Feb. 28, 1989

[54] BI-DIRECTIONAL DIFFERENCE COUNTER

[75] Inventors: Wilhelm Ohlinger, Jan Jose; Nicholas M. Warner, Livermore, both of Calif.

[73] Assignee: Unisys Corp., Detroit, Mich.

[21] Appl. No.: 20,405

[22] Filed: Mar. 2, 1987

[51] Int. Cl.⁴ .................. G05B 11/18; G11B 21/10
[52] U.S. Cl. .................... 318/603; 318/600; 318/618; 360/77 R; 360/78.07
[58] Field of Search ........... 318/560, 569, 592, 593, 318/594, 600, 603, 626, 628, 565, 640, 618; 360/69, 70, 72.1, 72.2, 72.3, 73, 71, 74.1, 77, 78; 346/137, 486

[56] References Cited

U.S. PATENT DOCUMENTS

| | | | |
|---|---|---|---|
| 3,789,378 | 1/1974 | Bonzano et al. | 360/78 |
| 3,845,500 | 10/1974 | Hart | 360/77 |
| 4,006,394 | 2/1977 | Cada et al. | 360/78 |
| 4,052,741 | 10/1977 | Baca et al. | 360/77 |
| 4,149,198 | 4/1979 | Behr et al. | 360/77 |
| 4,208,679 | 6/1980 | Hertrich | 360/77 |
| 4,310,861 | 1/1982 | Kashio | 360/78 X |
| 4,333,117 | 6/1982 | Johnson | 360/78 |
| 4,456,934 | 6/1984 | Wedman et al. | 360/77 X |
| 4,488,187 | 12/1984 | Alaimo | 360/78 X |
| 4,499,510 | 2/1985 | Harding et al. | 360/78 X |
| 4,547,822 | 10/1985 | Brown | 360/78 |
| 4,558,383 | 12/1985 | Johnson | 360/77 |
| 4,602,196 | 7/1986 | Matsui | 318/603 |
| 4,613,916 | 9/1986 | Johnson | 360/77 |
| 4,630,190 | 12/1986 | Alaimo et al. | 360/77 X |

Primary Examiner—William M. Shoop, Jr.
Assistant Examiner—Paul Ip
Attorney, Agent, or Firm—John J. McCormack; Nathan Cass; Kevin R. Peterson

[57] ABSTRACT

Disclosed is a servo control system for a disk drive actuator using a bi-directional (Up/Down) Difference Counter along with a control circuit therefor which signals the counter each time a "rest position" is passed, indicating whether this passage is toward, or away-from, the destination track.

10 Claims, 6 Drawing Sheets

Fig. 5

| INPUTS | | | CURRENT STATE | | | OUTPUTS | | NEXT STATE | | |
|---|---|---|---|---|---|---|---|---|---|---|
| P>Q | P>-Q | DIFF=0 | S0 | S1 | FORWARD | DECR | INCR | S0 | S1 | FORWARD |
| NO CHARGE | | | | | | | | | | |
| 0 | 1 | X | 0 | 1 | X(n) | 0 | 0 | 0 | 1 | X(n-1) |
| 0 | 0 | X | 0 | 0 | X(n) | 0 | 0 | 0 | 0 | X(n-1) |
| 1 | 0 | X | 1 | 0 | X(n) | 0 | 0 | 1 | 0 | X(n-1) |
| 1 | 1 | X | 1 | 1 | X(n) | 0 | 0 | 1 | 1 | X(n-1) |
| OFF BY TWO | | | | | | | | | | |
| 0 | 1 | X | 1 | 0 | X(n) | 0 | 0 | 0 | 1 | X(n-1) |
| 0 | 0 | X | 1 | 1 | X(n) | 0 | 0 | 0 | 0 | X(n-1) |
| 1 | 0 | X | 0 | 1 | X(n) | 0 | 0 | 1 | 0 | X(n-1) |
| 1 | 1 | X | 0 | 0 | X(n) | 0 | 0 | 1 | 1 | X(n-1) |
| REVERSE 1, SEEK REVERSE | | | | | | | | | | |
| 0 | 1 | 0 | 0 | 0 | 0 | 1 | 0 | 0 | 1 | 0 |
| 0 | 0 | 0 | 1 | 0 | 0 | 1 | 0 | 0 | 0 | 0 |
| 1 | 0 | 0 | 1 | 0 | 0 | 1 | 0 | 1 | 0 | 0 |
| 1 | 1 | 0 | 0 | 1 | 0 | 1 | 0 | 1 | 1 | 0 |
| REVERSE 1, OVERSHOOT | | | | | | | | | | |
| 0 | 1 | 1 | 0 | 0 | 1 | 0 | 1 | 0 | 1 | 1 |
| 0 | 0 | 1 | 1 | 0 | 1 | 0 | 1 | 0 | 0 | 1 |
| 1 | 0 | 1 | 1 | 0 | 1 | 0 | 1 | 1 | 0 | 1 |
| 1 | 1 | 1 | 0 | 1 | 1 | 0 | 1 | 1 | 1 | 1 |
| REVERSE 1, SEEK FORWARD | | | | | | | | | | |
| 0 | 1 | X | 0 | 0 | 1 | 0 | 1 | 0 | 1 | 1 |
| 0 | 0 | X | 1 | 0 | 1 | 0 | 1 | 0 | 0 | 1 |
| 1 | 0 | X | 1 | 0 | 1 | 0 | 1 | 1 | 0 | 1 |
| 1 | 1 | X | 0 | 1 | 1 | 0 | 1 | 1 | 1 | 1 |
| FORWARD 1, SEEK FORWARD | | | | | | | | | | |
| 0 | 1 | 0 | 0 | 1 | 1 | 0 | 0 | 0 | 1 | 1 |
| 0 | 0 | 0 | 1 | 1 | 1 | 1 | 0 | 0 | 0 | 1 |
| 1 | 0 | 1 | 0 | 0 | 1 | 0 | 1 | 1 | 0 | 0 |
| 1 | 1 | 1 | 1 | 0 | 1 | 0 | 1 | 1 | 1 | 0 |
| FORWARD 1, OVERSHOOT | | | | | | | | | | |
| 0 | 1 | 1 | 0 | 1 | 1 | 0 | 1 | 0 | 1 | 0 |
| 0 | 0 | 1 | 1 | 1 | 1 | 0 | 1 | 0 | 0 | 0 |
| 1 | 0 | 1 | 0 | 0 | 1 | 0 | 1 | 1 | 0 | 0 |
| 1 | 1 | 1 | 1 | 0 | 1 | 0 | 1 | 1 | 1 | 0 |
| FORWARD 1, REVERSE SEEK | | | | | | | | | | |
| 0 | 1 | X | 0 | 1 | 0 | 0 | 1 | 0 | 1 | 0 |
| 0 | 0 | X | 1 | 1 | 0 | 0 | 1 | 0 | 0 | 0 |
| 1 | 0 | X | 0 | 0 | 0 | 0 | 1 | 1 | 0 | 0 |
| 1 | 1 | X | 1 | 0 | 0 | 0 | 1 | 1 | 1 | 0 |

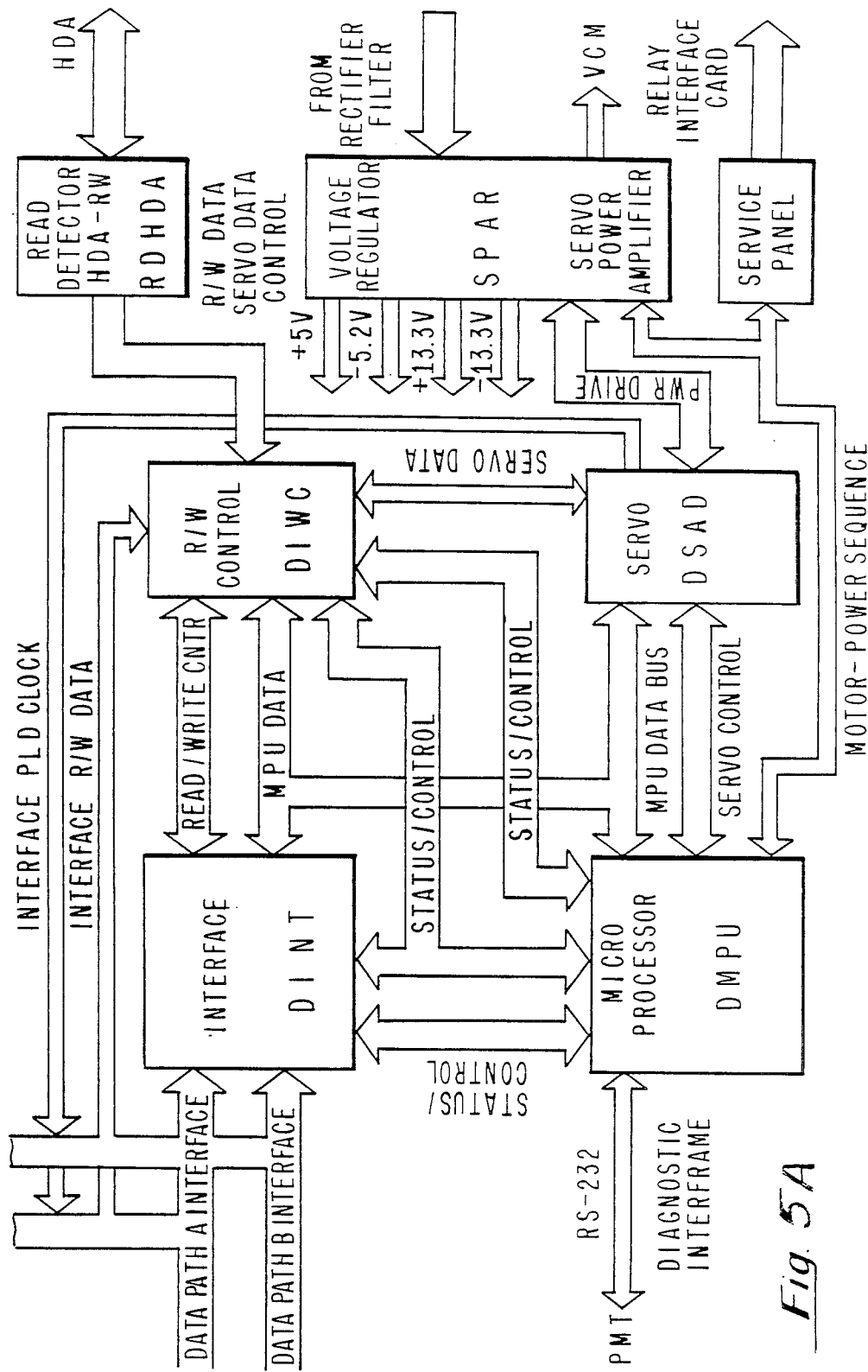

BI-DIRECTIONAL DIFFERENCE COUNTER

The purpose of this invention is to provide a difference counter for a servo control mechanism. The difference counter tracks the movement of disk drive actuator from an initial cylinder to a destination cylinder during a "Seek" operation.

In existing disk drive products a difference counter is loaded with the number of cylinders to traverse at the beginning of a seek. The difference counter is decremented at each track crossing as the actuator moves toward the destination cylinder.

There are several disadvantages to this method. For various reasons the servo actuator may "overshoot" the destination cylinder before finally coming to rest; when this occurs, the contents of the difference counter are indeterminate as the difference counter is decremented by track crossings both toward and away from a destination cylinder. Also, Servo systems are prone to electrical noise, and this may cause "false track crossings" to be generated and cause the difference counter to be erroneously decremented. The track crossing information is generated from servo data recorded on a servo disk. This data is subject to "drop-outs" which may cause erroneous track crossing information to be generated and cause the difference counter to be erroneously decremented. Our invention addresses these problems.

INVENTION FEATURES

Herein we teach an improved system, one using a modified difference counter that is decremented by track crossing towards the destination cylinder and is incremented by track crossings away from the destination cylinder. Preferably, the track crossings are detected by comparing position and position quadrature signals (P, Q, one set where P>+Q; and then where P>−Q) and using the results to increment or decrement a Difference Counter (e.g., as indicated in FIGS. 3A, 3B).

The contents of the difference counter therefore always represent the number of track crossings between the current actuator position and the desired "rest position," even when the servo overshoots the destination track. This difference counter is also tolerant of false track crossings caused by electrical noise or drop-outs in the servo data because the counter can be incremented to compensate for the decrement caused by the detection of false track crossing. Thus, a proposed Difference Counter control circuit monitors servo position information and generates appropriate increment or decrement signals for the Difference Counter depending on the movement of the servo actuator.

Thus, an object hereof is to provide at least some of the noted features and advantages, and address the indicated problems. Another object is to provide a servo system tolerant of "overshoots," one that allows the servo system to be adjusted for minimum access time without regard to servo overshoots.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1 is a schematic idealized block diagram of a difference counter used in a "control" system for controlling disk drive servo means, while

FIG. 5 is a state table applicable to the embodiment of FIG. 3;

FIG. 5A is an overall block diagram of a disk drive servo system apt for using this embodiment;

DESCRIPTION OF THE PREFERRED EMBODIMENT

General description, background:

FIG. 3 schematically illustrates a preferred difference counter embodiment constructed according to principles of this invention (implemented in the circuits of FIGS. 7-12). This, and other means discussed herein, will generally be understood as constructed and operating as presently known in the art, except where otherwise specified.

And, except as otherwise specified, all materials, methods and devices and apparatus herein will be understood as implemented by known expedients according to present good practice.

Figure 1:
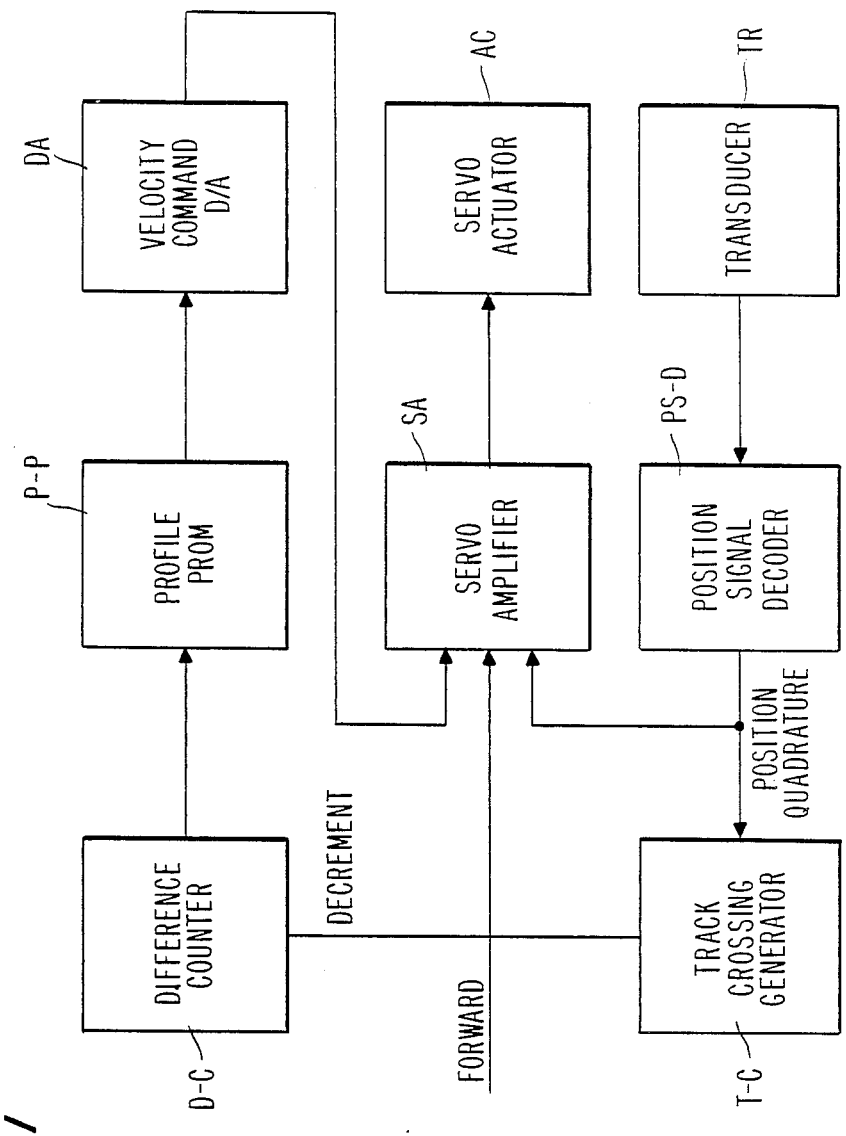
Figure 2:
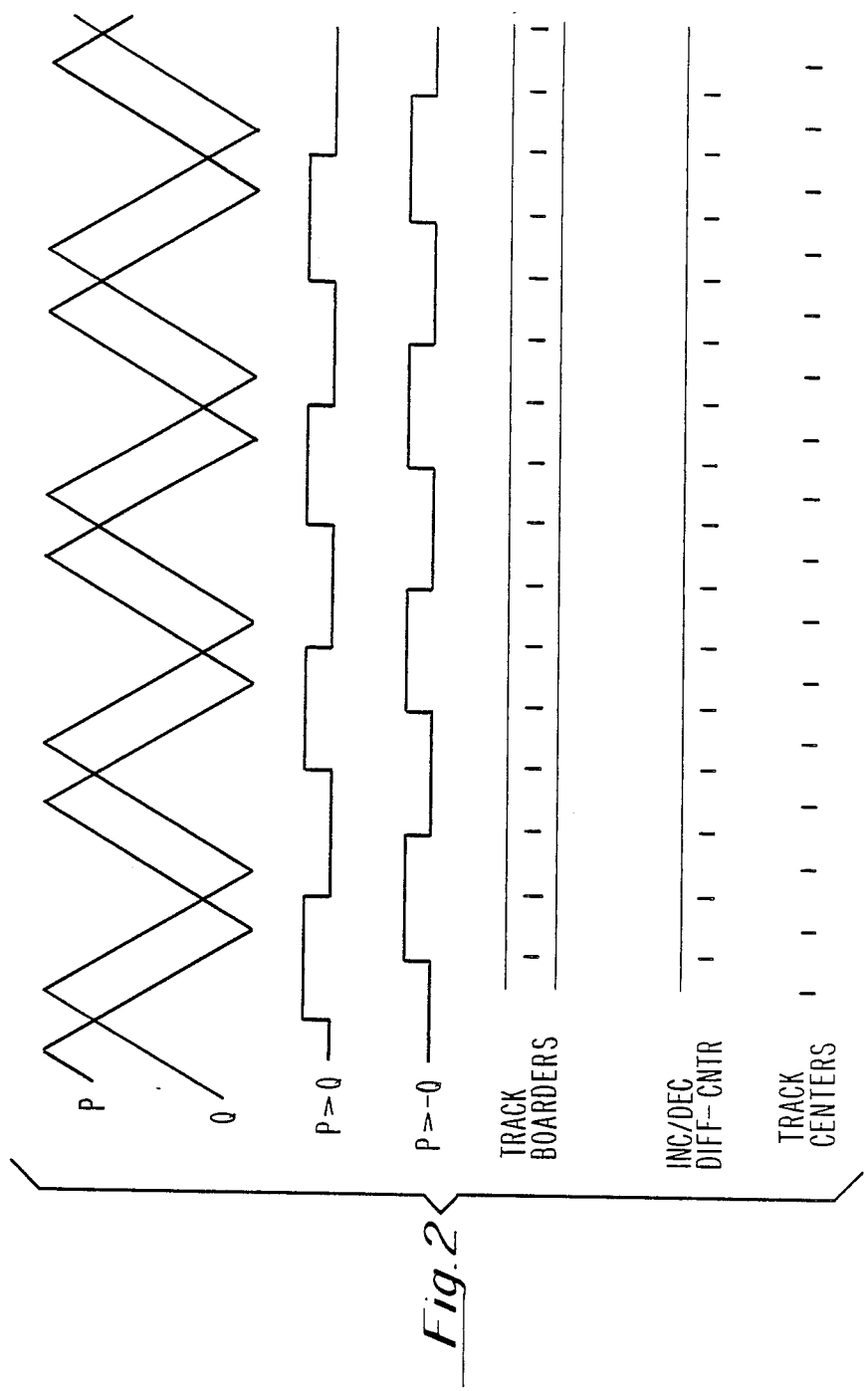
FIG. 2 is a plot of idealized position and other signals shown in idealized time relation.

Control Method A (FIG. 1)

FIG. 1 is given by way of a control technique for comparison with our preferred technique (e.g., see FIG. 3). Here, a servo amplifier SA will be understood as driving a servo actuator AC (e.g., energizing the coil thereof) which translates servo transducer means TR across prescribed servo tracks and is understood as arranged to provide "positioning" signal output; e.g., to a prescribed decoding means PS-D. PS-D responsively applies "position" and "position quadrature" signals to a track-crossing detect means T-C which applies track-crossing signals to a difference counter D-C. Counter D-C is adapted to control a "Profile Prom" stage P-P so as to initiate a "deceleration profile" for the actuator AC (converted via DA stage).

The operation may be summarized as follows.

The Difference Counter DC is loaded with the number of cylinders between the initial cylinder and the destination cylinder for the "Seek" operation. The output of the difference counter is fed to profile PROM P-P, which contains the deceleration profile for the servo actuator. The output of profile PROM P-P is fed to the velocity command Digital to Analog convertor DA which converts the binary output of the profile PROM to an analog velocity command voltage. The velocity command volage is fed to servo amplifier SA which has a power output stage that drives the servo actuator AC. Coupled to the servo actuator is a Transducer TR which reads servo information recorded on a servo disk. The servo information is decoded to produce "Position" and "Position Quadrature" signals which are used by the Track Crossing generator T-C to generate a decrement signal to decrement Difference Counter D-C as the servo actuator moves from one track to the next.

More particularly, in a disk drive like the Memorex 3680, at the beginning of a "Seek" operation, the drive-microprocessor loads the Difference Counter on the DC-Board with the number of tracks the servo system is to move. It also instructs the SA-Board in what direction to seek. The actual "Seek" operation is started by applying an "ACCELERATE" signal to the Access State Register of the SA-Board.

As the carriage starts moving across the tracks of the disk, the SA-Board generates track crossing pulses and sends them over to the DC-Board. These track crossing pulses feed into the Difference Counter and decrement it by one for each track crossed. Track crossing pulses are generated when the servo head is over the CENTER of a track.

The continuously decrementing Difference Counter feeds into the Profile Rom on the SA-Board whose outputs are applied to the Velocity Control D/A Converter.

As the servo head approaches the desired track the servo velocity is gradually reduced and reaches a set value (e.g., here approximately 4.5 μin/sec) when the distance to the target is "One track." At this point the micro processor switches the servo Access State register from "DECELERATE" to "VELOCITY SETTLE" and clears the Difference Counter to "0".

This happens at track center, one track before the "target track." The servo now moves slowly across the track border of the target track and toward the center of the target track.

The microprocessor waits for a signal "END DECELERATE" supplied by the SA-Board. This signal is generated by monitoring the tachometer of the servo system. After "END DECELERATE" going active the microprocessor waits 300 μs and then applies the state "POSITION SETTLE" to the Access State Register of the servo system. At this time the microprocessor also enables the track following timer.

Now the microprocessor waits for the servo head to settle over the center of the target track by waiting for a signal "R/W CAPABLE" which is generated on the DC-Board. This signal is basically derived from the signal "FINE POSITION" supplied by the SA-Board.

If the servo for one reason or another overshoots the target track, (that is, if the servo reaches track target-1 and is put into "position settle" mode, and still moves too fast to come to a stop on the target track center), then, the servo will end up on a wrong track when it finally comes to a stop and "END DECELERATE" goes active.

Our preferred embodiment addresses such problems (See FIG. 3).

Figure 3A:
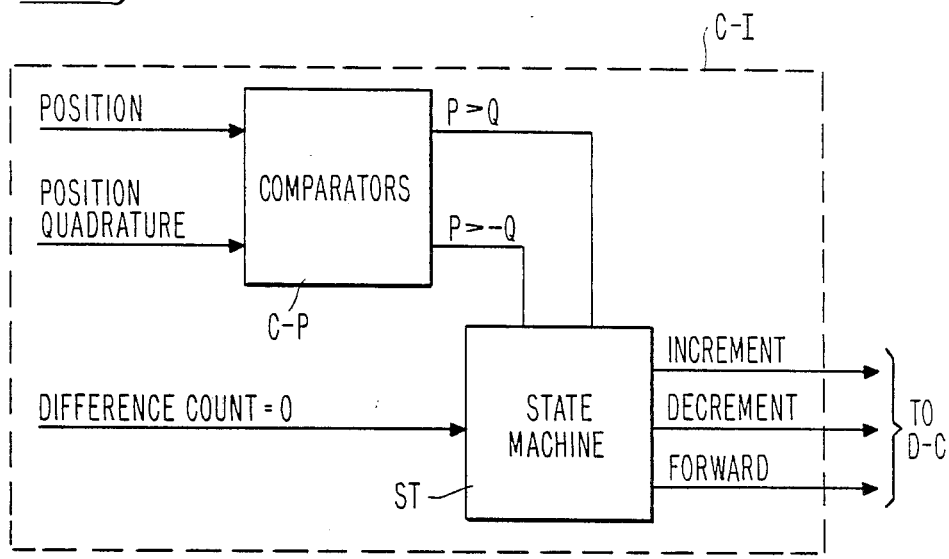
FIG. 3B is a like diagram for a preferred embodiment, a modification of FIG. 1, with FIG. 3A detailing the Difference Counter (D-C) control circuit thereof.
Figure 3B:
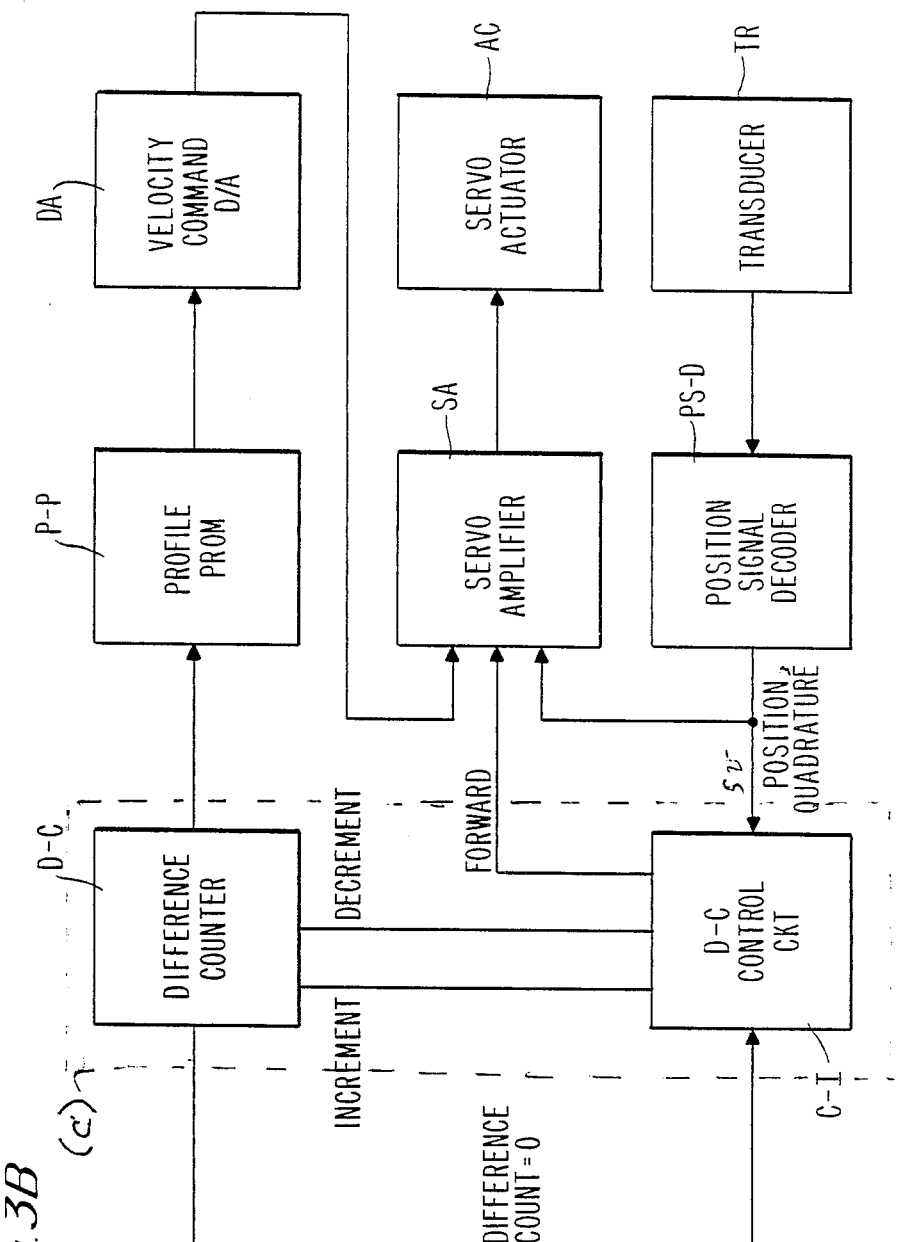

Preferred Method B (FIGS. 3A, 3B)

FIGS. 3A, 3B indicate a modification of the foregoing in several respects. Here the Difference Counter will be understood as able to increment as well as decrement. That is, it modifies the seek difference counter circuit so that it will count up if the actuator moves away from the destination track, as happens when a seek overshoot occurs. This enables a more optimal servo system to be designed that will automatically recover from an overshoot condition without the need to "rezero" the servo and "reseek" the track. The servo system may then be adjusted for minimum access time without regard to overshoot considerations.

This up/down difference counter circuit requires that the servo system be sensitive to the direction of the velocity feedback; thus, a bidirectional Tachometer is also called for.

Also the "track crossing detector circuit" T-C is replaced by a Difference Counter control circuit C-I which uses a "State Machine" to generate increment and decrement signals from the Position, Position Quadrature signals and its own internal state. The Difference Counter control circuit is shown in block diagram form in FIG. 3A; (in FIG. 3B, it replaces the track-crossing unit T-C).

This up/down counting scheme not only tolerates servo overshoots (allows servo to overshoot if something goes wrong during a servo operation) but also offers the ability to run the servo at marginal high speeds, a feature that will improve average access time.

Figure 4:
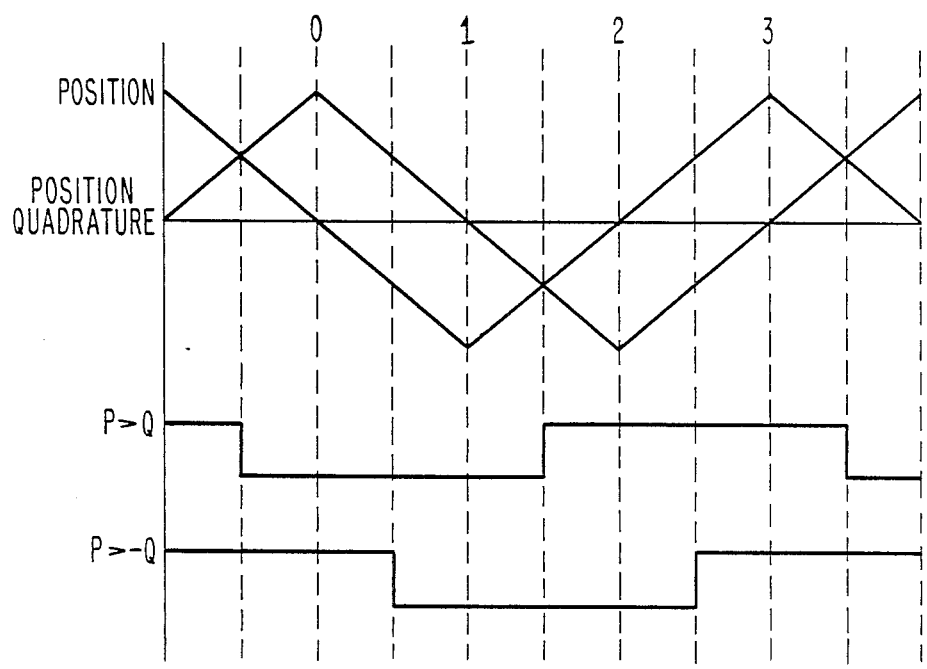
FIG. 4 is a like plot of position and position-quadrature signals.

The relationship between the "Position," "Position Quadrature" and the "P>Q" and P>−Q" signals is shown in FIG. 4. The rest positions of the servo system are numbered 0, 1, 2, and 3, (many other such rest positions exist across the disk surface).

In FIG. 3B, the arrangement of FIG. 1 will be understood as modified by a counter-input stage C-I (replacing T-C in FIG. 1), adapted to provide a modified input to the Difference Counter D-C and as shown in FIG. 3A, comprising a Comparator stage C-P coupled to apply "P>Q," "P>−Q" signals to a prescribed state machine ST which responsively issues "Increment," "Decrement" and "Forward" commands to control servo amplifier means, [cf "increment" allows actuator to compensate for false track-crossing, or back-up after "overshoot;" "Forward" sends the actuator in the direction of "SEEK"].

Up/Down Difference Counter

The state machine continually monitors the P>Q and P>−Q signals to determine the direction of actuator motion. The system is designed to be tolerant of "dropouts" in the servo signals by requiring that any change in the DETP or DETQ signals is maintained for a fixed period of time before it is acted upon. State machine ST increments or decrements the difference counter as required by actuator motion and adjusts the "seek-direction-bit" so that the servo demand is always towards the target cylinder.

As the actuator nears the target cylinder, the microprocessor determines if an overshoot is going to occur. This is done by monitoring a "coarse" position signal that is generated by comparing the Position signal to a reference level. If the "coarse" position is maintained for a fixed length of time the microprocessor decides that no overshoot will occur and initiates the "position-settle" part of the seek. Otherwise the servo remains in the deceleration mode.

Operation

The operation of counter control stage C-I may be summarized as follows.

The Difference Counter is controlled by the STATE Machine (SERVO SEQUENCER) which is implemented in a set of two programmable logic devices.

Using this method, the Difference counter is decremented during a servo operation (as before) as the servo head approaches the target track. The decrement is done by the Servo Sequencer. The difference counter reaches "0" as the servo head moves across the last track border into the target track. The Micro Processor on the DMPU-Board then applies "POSITION MODE" to the Access State Register on the DSAD-Board. The Servo system, being in Position Mode, will now guide the Servo Head to the center of the target track. A "FINE POSITION" signal from the DSAD-Board will go active and tell the DMPU-Board that the center of the target track is reached. The DMPU-Board Micro Processor then checks for "R/W CAPABLE" and concludes that the servo head has correctly landed on the target track.

When the servo head approaches a target track too fast, and therefore overshoots the target, the Difference Counter is INCREMENTED from zero to one by the Servo Sequencer as soon as it moves into track "target +1."

At this point the Servo Sequencer also changes the forward direction signal to the DSAD-Board, so the servo is directed to return to the target track that was overshot.

But as long as the servo keeps overshooting and moves away from the target the Difference Counter is incremented.

Eventually the servo will come to a stop, and will change direction toward the target track. As soon as the servo starts moving "towards" the target track, the Servo Sequencer decrements the Difference Counter again. The Difference Counter reaches ZERO as the Servo Head moves back onto the target track, where "Position Mode" is applied to the servo system as in a regular seek.

The servo sequencer (state machine ST) continuously monitors the P>Q and P>−Q signals. The state of these signals is compared to the internal state of the "State machine." The State machine generates appropriate "increment" or "decrement" signals to the Difference Counter D-C according to the "state table" given in FIG. 5.

This method ensures that the Difference Counter contents track the movement of the servo actuator across the disk surface.

When movement is toward the destination cylinder, the Difference Counter control circuit causes the Difference Counter to be decremented; when movement is away from the destination cylinder, the Difference Counter control circuit causes the Difference Counter to be incremented. The contents of the difference counter will thus always be "valid," even when the servo actuator overshoots the destination cylinder before coming to rest.

This method provides a high degree of noise immunity. If noise on the "Position" or "Position Quadrature" signal causes the Difference Counter to be falsely decremented, then, as soon as the Position or Position Quadrature signal returns to its correct level, the Difference Counter control circuit will increment the Difference Counter. This will eliminate the effect of any false decrement.

FIG. 5A is a like block diagram of related servo control logic.

Results:

Workers will perceive several surprising, advantageous features accruing to this new technique. For instance, it will be seen to yield a Difference Counter which is able to both increment and decrement; a Difference Counter control circuit which monitors the servo position information and generates appropriate increment or decrement signals for the Difference Counter depending on actuator movement direction; and, it allows a system to compensate for "False Track-crossing" signals and for "overshoot."

The embodiment also allows one to tailor a "SEEK DECELERATION Profile", for minimum average access time regardless of "servo overshoots".

Alternate Methods

Our preferred method has been described in terms of specific signals (P>Q and P>−Q) derived from "Position" and "Position Quadrature" signals; but other signals could have been used (e.g., P>O and Q>O). The method has been described in terms of a quadrature positioning system; however, it is equally applicable to nonquadrature systems.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other high density disk files, as well as to related systems. Also, the present invention is applicable for enhancing other types of servo systems.

The above examples of possible variations of the present invention are merely illustrative. Accordingly, the present invention is to be considered as including all possible modifications and variations coming within the scope of the invention as defined by the appended claims.

What is claimed is:

1. A disk drive servo-control system including counter means C that is decremented by track-crossing signals T-C generated as a servo arm A is moved toward a destination track $T_d$ and away therefrom, the counter means C being decremented responsive to the track crossing signals T-C as the arm moves toward track $T_d$ and being incremented as the arm moves away therefrom; and wherein means are provided for detecting position signals (P) and position quadrature signals (Q); plus compare means CR adapted to detect crossings, receiving signals P and Q generating track-crossing signals T-C P>+Q and whenever P>−Q, applying these track crossing signals T-C to increment or decrement said Counter means C, so that the contents thereof always represent the number of track-crossings between the current position of Arm A and destination track $T_d$, even if overshoot occurs.

2. The invention of claim 1 wherein counter means (C) is thus adapted to tolerate false track-crossing signals $\overline{t\text{-}c}$ caused by electrical noise, drop-outs, with counter means (C) apt for being incremented to compensate for such signals $\overline{t\text{-}c}$.

3. A disk drive servo control system including counter means C that is decremented by track-crossing signals T-C generated as a servo arm A is moved toward a destination track $T_d$ and away therefrom, the counter means C being decremented responsive to the track crossing signals T-C as the arm moves toward track $T_d$ and being incremented as the arm moves away therefrom;

plus servo means provided to generate servo signals SV indicating movement of the arm A across disk tracks;

said counter means C, comprising a Difference Counter stage and associated counter control circuit CC, arranged to monitor said servo signals SV and to responsively generate appropriate increment or decrement signals and apply these to the Difference Counter, depending on movement of the actuator arm A.

4. The invention of claim 3 wherein the system also includes bi-directional Tachometer means.

5. The invention of claim 4 wherein said signals (T-C) are derived from prescribed rest position signals by associated position-indicator means.

6. A disk drive servo control system including counter means C that is decremented by track-crossing signals T-C generated as a servo arm A is moved toward a destination track $T_d$ and away therefrom, the counter means C being decremented responsive to the track crossing signals T-C as the arm moves toward track $T_d$ and being incremented as the arm moves away therefrom, the counter means C being adapted to compensate for overshoot by arm A and for such noise events as cause false track-crossing signals t-c, counter means C comprising an up/down Difference Counter stage D-C and an associated Counter Control stage C-I, stage C-I comprising comparator means C-P adapted to compare position signals (P) and quadrature signals (Q) and responsively issue "P>Q" and "P>−Q" signals, representative of track-crossings.

7. The invention of claim 6 wherein said stage (C-I) further comprises a State machine (ST) adapted to receive said (P>Q) and (P>−Q) signals, along with related difference signals and responsively issue Increment, Decrement and Forward commands applied to said Counter stage (D-C.)

8. The invention of claim 7 wherein said counter stage (D-C) is arranged and adapted to control power-input means (SP) to activate said arm (A) via Velocity Profile Control Means.

9. The invention of claim 8 wherein said position signals (P) and quadrature signals (Q) are derived from servo transducer means TR and intermediate Decoder means (PS-D).

10. The invention of claim 8 wherein said state machine (ST) is adapted and arranged to require that any change in track-crossing indications input thereto be maintained for a prescribed minimum time ($t_{min}$) before accepted as valid to thereby tolerate drop-outs.

* * * * *